(12) United States Patent
Belongia

(10) Patent No.: US 8,464,384 B2
(45) Date of Patent: Jun. 18, 2013

(54) STOP AND LOCK FOR A VERTICALLY STORING DOCK LEVELER

(75) Inventor: Paul Belongia, Fredonia, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/426,273

(22) Filed: Mar. 21, 2012

(65) Prior Publication Data
US 2012/0180233 A1    Jul. 19, 2012

Related U.S. Application Data

(63) Continuation of application No. 11/610,831, filed on Dec. 14, 2006.

(51) Int. Cl.
*E01D 1/00*    (2006.01)

(52) U.S. Cl.
USPC ............................................. 14/71.7; 14/71.3

(58) Field of Classification Search
USPC ................................................. 14/71.1, 71.3
See application file for complete search history.

(56) References Cited

U.S. PATENT DOCUMENTS

| | | | |
|---|---|---|---|
| 2,974,336 A | 3/1961 | Kelley | |
| 2,993,219 A | 7/1961 | Pennington | |
| 3,352,440 A | 11/1967 | Wilson | |
| 3,409,922 A | 11/1968 | Beckwith et al. | |
| 3,584,324 A | 6/1971 | Merrick | |
| 3,835,497 A * | 9/1974 | Smith | 14/71.3 |
| 3,883,917 A * | 5/1975 | Alten | 14/71.3 |
| 3,967,337 A | 7/1976 | Artzberger | |
| 4,641,388 A | 2/1987 | Bennett et al. | |
| 4,776,052 A | 10/1988 | Delgado et al. | |
| 4,827,549 A * | 5/1989 | Walker | 14/71.7 |
| 5,117,526 A | 6/1992 | Alexander | |
| 5,123,135 A | 6/1992 | Cook et al. | |
| 5,343,583 A | 9/1994 | Cook | |
| 5,396,676 A | 3/1995 | Alexander et al. | |
| 5,401,096 A | 3/1995 | Stang | |
| 5,586,355 A * | 12/1996 | Metz et al. | 14/69.5 |
| 5,657,502 A * | 8/1997 | Ellis | 14/71.1 |
| 6,035,475 A | 3/2000 | Alexander | |
| 6,125,491 A | 10/2000 | Alexander | |
| 6,502,267 B2 | 1/2003 | MacDonald et al. | |

(Continued)

OTHER PUBLICATIONS

United States Patent and Trademark Office, "Notice of Allowance," issued in connection with U.S. Appl. No. 11/610,831, mailed Feb. 24, 2012, 15 pages.

(Continued)

*Primary Examiner* — Thomas B Will
*Assistant Examiner* — Abigail A Risic
(74) *Attorney, Agent, or Firm* — Hanley, Flight & Zimmerman, LLC

(57) ABSTRACT

A dock leveler with a pivotal deck includes a stop mechanism that provides the deck with a positive stop at the deck's vertically stored position without the deck's actuator having to be fully extended. With the actuator being less than fully extended, the stop mechanism and actuator can exert opposing forces that help prevent the deck from rocking back and forth as the deck settles to its stationary, upright position. In some cases, the stop mechanism is part of a combination stop-and-lock mechanism that includes a locking device for temporary providing a redundant or alternate lock that prevents the deck from descending unexpectedly while the dock leveler is being serviced or repaired.

18 Claims, 4 Drawing Sheets

U.S. PATENT DOCUMENTS

| | | | |
|---|---|---|---|
| 6,502,268 | B2 | 1/2003 | Ashelin et al. |
| 6,698,052 | B2 | 3/2004 | Stolk |
| 6,746,068 | B1 | 6/2004 | Hurd |
| 7,320,557 | B1 | 1/2008 | Potter |
| 2004/0118314 | A1 | 6/2004 | Hart et al. |
| 2008/0141470 | A1 | 6/2008 | Belongia |

OTHER PUBLICATIONS

United States Patent and Trademark Office, "Final Office Action," issued in connection with U.S. Appl. No. 11/610,831, mailed Mar. 31, 2011, 18 pages.

United States Patent and Trademark Office, "Non-Final Office Action", issued in connection with U.S. Appl. No. 11/610,831, mailed Jul. 19, 2010, 17 pages.

United States Patent and Trademark Office, "Final Office Action," issued in connection with U.S. Appl. No. 11/610,831, mailed Mar. 31, 2010, 21 pages.

United States Patent and Trademark Office, "Non-Final Office Action," issued in connection with U.S. Appl. No. 11/610,831, mailed May 28, 2009, 19 pages.

Canadian Intellectual Property Office, "Office Action," issued in connection with Canadian application serial No. 2,613,868, issued Mar. 29, 2011, 3 pages.

Canadian Intellectual Property Office, "Office Action," issued in connection with Canadian application serial No. 2,613,868, issued Apr. 14, 2010, 3 pages.

Canadian Patent Office, "Notice of Allowance," issued in connection with Canadian application serial No. 2,613,868, issued Sep. 19, 2012, 1 page.

* cited by examiner

STOP AND LOCK FOR A VERTICALLY STORING DOCK LEVELER

CROSS-REFERENCE TO RELATED APPLICATIONS

This patent arises from a continuation of U.S. patent application Ser. No. 11/610,831, filed Dec. 14, 2006, entitled "STOP AND LOCK FOR A VERTICALLY STORING DOCK LEVELER," which is hereby incorporated herein by reference in its entirety.

FIELD OF THE DISCLOSURE

The present disclosure generally pertains to dock levelers with a vertically storing deck and, more specifically, to a stop-and-lock mechanism for a deck.

BACKGROUND OF RELATED ART

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. An extension plate or lip extends outward from the deck's front edge to span the gap between the rear of the truck bed and the front edge of the deck. This allows personnel and material handling equipment to readily move on and off the vehicle during loading and unloading operations.

The deck is usually moveable between a stored position and an operative position. Depending on the style of dock leveler, the deck may store either vertically or horizontally. U.S. Pat. No. 6,502,268 shows an example of a horizontally storing deck, and U.S. Pat. No. 5,396,676 discloses a dock leveler with a vertically storing deck.

Vertically storing decks are usually driven by a hydraulic cylinder. The hydraulic cylinder typically extends to raise the deck to its vertically stored position and retracts as the deck descends to its operative position. The force for lowering the deck can come from the hydraulic action within the cylinder and/or the weight of the deck itself. In some cases, the deck's weight urges the deck downward while a hydraulic flow restriction associated with the cylinder provides the deck with controlled descent.

The hydraulic cylinder can also be used for holding the pivotal deck at its vertically stored position. A pivotal anchor point of the cylinder, the pivotal anchor point of the deck, and the pivotal connection between the deck and the cylinder can be positioned so that the deck is vertical when the cylinder's piston rod bottoms out (i.e., the piston rod fully extends to the end of its stroke). When stopping and holding the deck in this manner, however, the radial pin clearance at the various pivotal connections allows the deck to rock back and forth before the deck settles to a completely stationary, upright position.

The temporary rocking motion may exert undo stresses and/or wear at the pin joints and related components. Moreover, when servicing or repairing the dock leveler, it may be desirable to have a redundant or more positive locking mechanism for holding the deck upright.

Consequently, a need exists for a better stop and/or locking mechanism for holding a dock leveler's deck at a vertically stored position and selectively securing it for service and repair work.

SUMMARY

In some embodiments, a vertically storing dock leveler includes a stop mechanism that provides a pivotal deck with a positive stop at the deck's vertically stored position without the deck's actuator having to be fully extended.

In some embodiments, a vertically storing dock leveler includes a combination stop-and-lock mechanism that provides a positive stop at the deck's vertically stored position and provides a redundant lock that prevents the deck from descending unexpectedly.

In some embodiments, the combination stop-and-lock mechanism includes a threaded connection for infinite adjustment of the deck's vertically stored position.

In some embodiments, a dock leveler includes a lock mechanism that can be selectively locked and unlocked by simply inserting or removing a blocking pin.

In some embodiments, a stop-and-lock mechanism provides relative sliding motion between itself and a pivotal deck. The relative sliding motion allows the deck and part of the stop-and-lock mechanism to pivot about two different axes.

DETAILED DESCRIPTION

Figure 1:
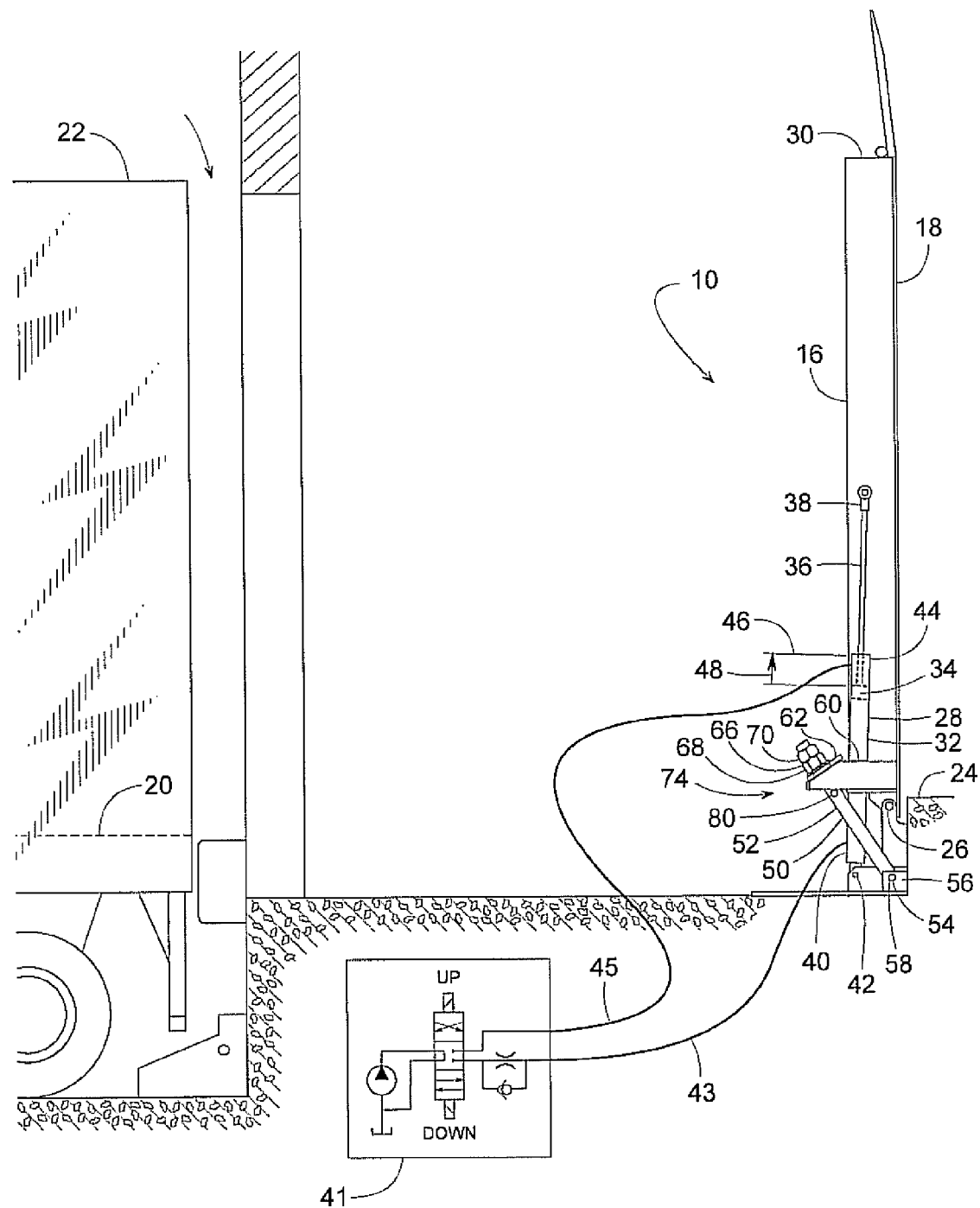
FIG. 1 is a side view of a dock leveler with its deck in a stored, upright position plus a schematic view a hydraulic system coupled to the dock leveler.
Figure 2:
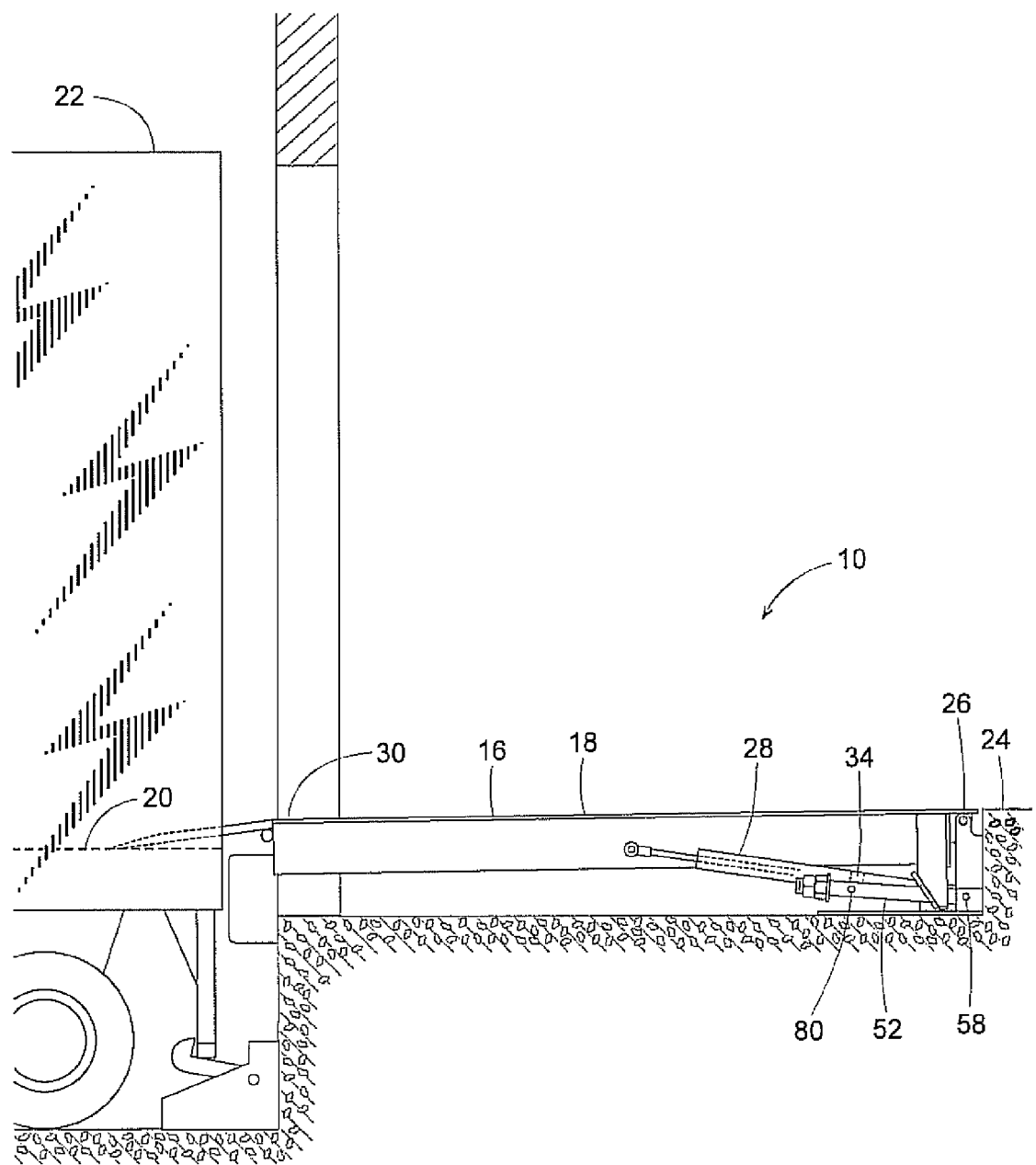
FIG. 2 is a side view of the dock leveler of FIG. 1 but showing the deck in a lowered, operative position.
Figure 3:
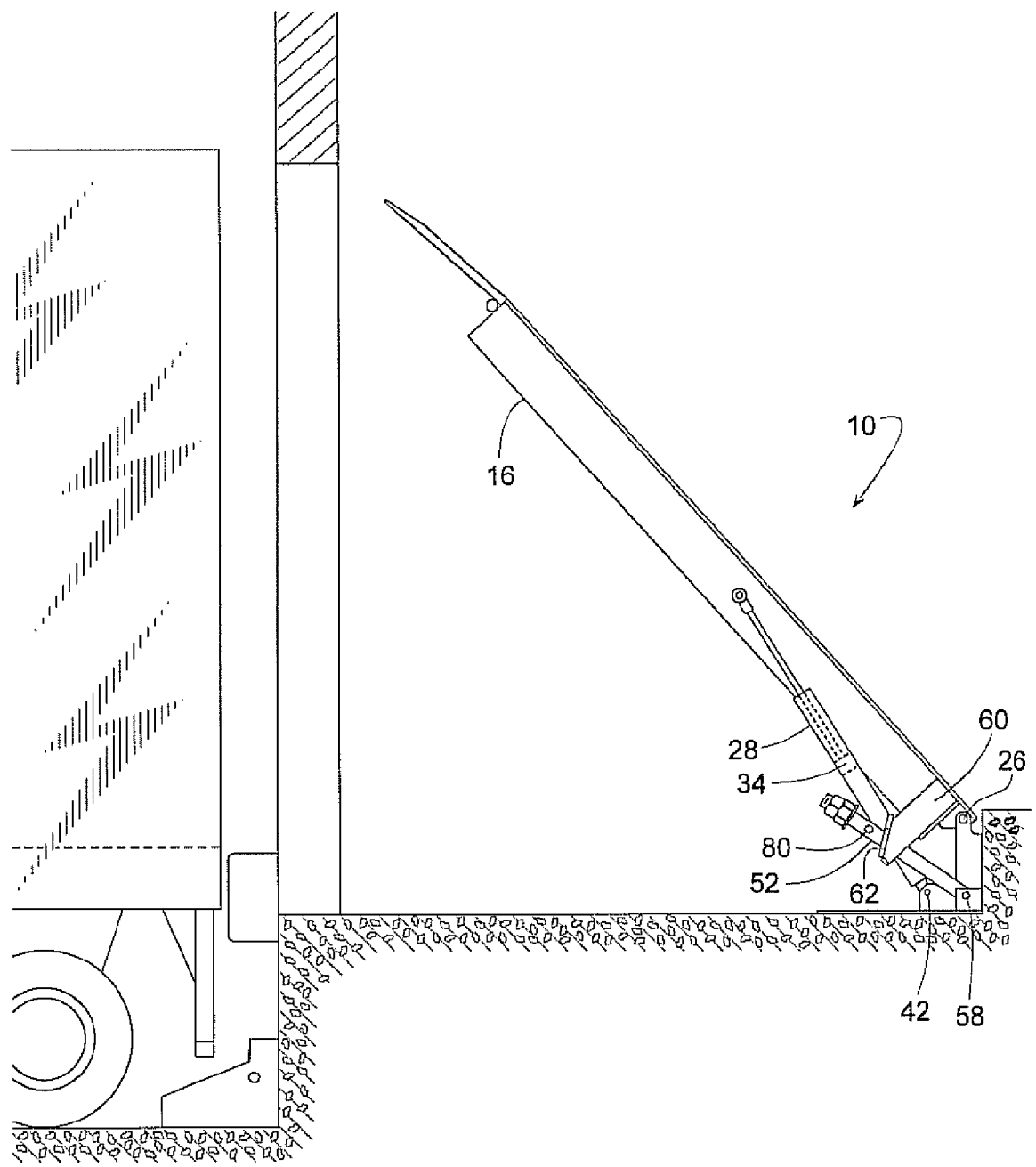
FIG. 3 is a side view similar to FIGS. 1 and 2 but showing the deck in an intermediate position.

FIGS. 1-3 illustrate a vertically storing dock leveler 10 installed at a loading dock 12 of a building 14. Dock leveler 10 includes a deck structure 16 that provides a variably inclined or level traffic surface 18 upon which material handling equipment and dockworkers can travel between a trailer bed 20 of a vehicle 22 and an elevated platform 24 within the building. The equivalent terms, "deck" and "deck structure" refer to those parts of the dock leveler that are substantially stationary relative to the pivotal traffic surface 18. In other words, deck structure 16 and traffic surface 18 generally move as one.

Deck 16 can pivot about a rear axis 26 so that an actuator 28 can position and hold deck 16 to a stored upright position (FIG. 1), various lowered operative positions (FIG. 2), and at an intermediate position (FIG. 3). Actuator 28 represent any powered device (e.g., single-acting hydraulic cylinder, double-acting hydraulic cylinder, pneumatic cylinder, rodless cylinder, inflatable bladder, rack-and-pinion, lead screw, hydraulic motor, electric motor, pneumatic motor, etc.) that can raise and/or lower the front end of a dock leveler's deck, such as front end 30 of deck 16. In one example, actuator 28 comprises a double-acting cylinder 32, a piston 34 and a piston rod 36. A distal end 38 of piston rod 36 is pinned to deck 16, and a cylinder end 40 is pinned for rotation about a stationary axis 42.

In this particular example, actuator 28 (double-acting cylinder 32) is powered by a hydraulic system 41 comprising conventional hydraulic control valves and a pump. The hydraulic valves are used for selectively pressurizing, trapping, and releasing hydraulic fluid in a first line 43 and a second line 45, wherein first line 43 leads to a cylinder end 40 of actuator 28 and second line 45 leads to a rod end 44. The pressure in lines 43 and 45 help determine the movement of deck 16.

To lower deck 16 from its stored upright position of FIG. 1 to its operative position of FIG. 2, hydraulic system 41 pressurizes rod end 44 via line 45 and controllably releases the hydraulic fluid within cylinder end 40 via line 43. This allows piston 34 and rod 36 to retract within cylinder 32. Due to the deck's weight, the pressure differential across piston 34, and the radial offset between the deck's pivotal axis 26 and the cylinder's pivotal axis 42, deck 16 pivots downward as actuator 28 retracts. Hydraulic system 41 may release the pressure in cylinder end 40 in a controlled manner so that deck 16 descends at a controlled rate.

To raise deck 16 from its operative position of FIG. 2 to its stored position of FIG. 1, hydraulic system 41 deliver hydraulic pressure to cylinder end 40 via line 43 and releases pressure from rod end 44 via line 45. The hydraulic pressure at cylinder end 40 acts upon piston 34 to urge actuator 28 from its retracted position (FIG. 2) toward a fully extended position. The fully extended position of actuator 28 is when piston 34 reaches its rated travel limit 46 at rod end 44 of cylinder 32 (assuming actuator 28 was entirely removed from dock leveler 10 and is completely free to extend). FIG. 1 shows piston 34 having stopped just short of limit 46, thus distance 48 represents the additional distance piston 34 would need to travel in order for actuator 28 to be at its fully extended position.

Since piston 34 has more distance to travel before bottoming out at the rod end of cylinder 32, as shown in FIG. 1, actuator 28 can continue urging deck 16 to pivot beyond the stored upright position. The phrase, "pivot beyond the stored upright position," refers to the deck traveling away from the upright position in an area that is outside the range that lies between the operative position and the vertically stored position. To prevent deck 16 from pivoting beyond the stored upright position, a stop mechanism 50 external to cylinder 32 mechanically stops deck 16 at its stored upright position. As actuator 28 continues urging deck 16 to move beyond its vertical position, stop mechanism 50 prevents such movement. Thus, actuator 28 and stop mechanism 50 exert opposing forces that can firmly hold deck 16 at its vertically stored position. At this point, hydraulic system 41 can de-energize its pump and actuate its valves to releasably trap hydraulic fluid in at least line 43, whereby the trapped fluid can hold deck 16 steady at its stored upright position.

Figure 4:
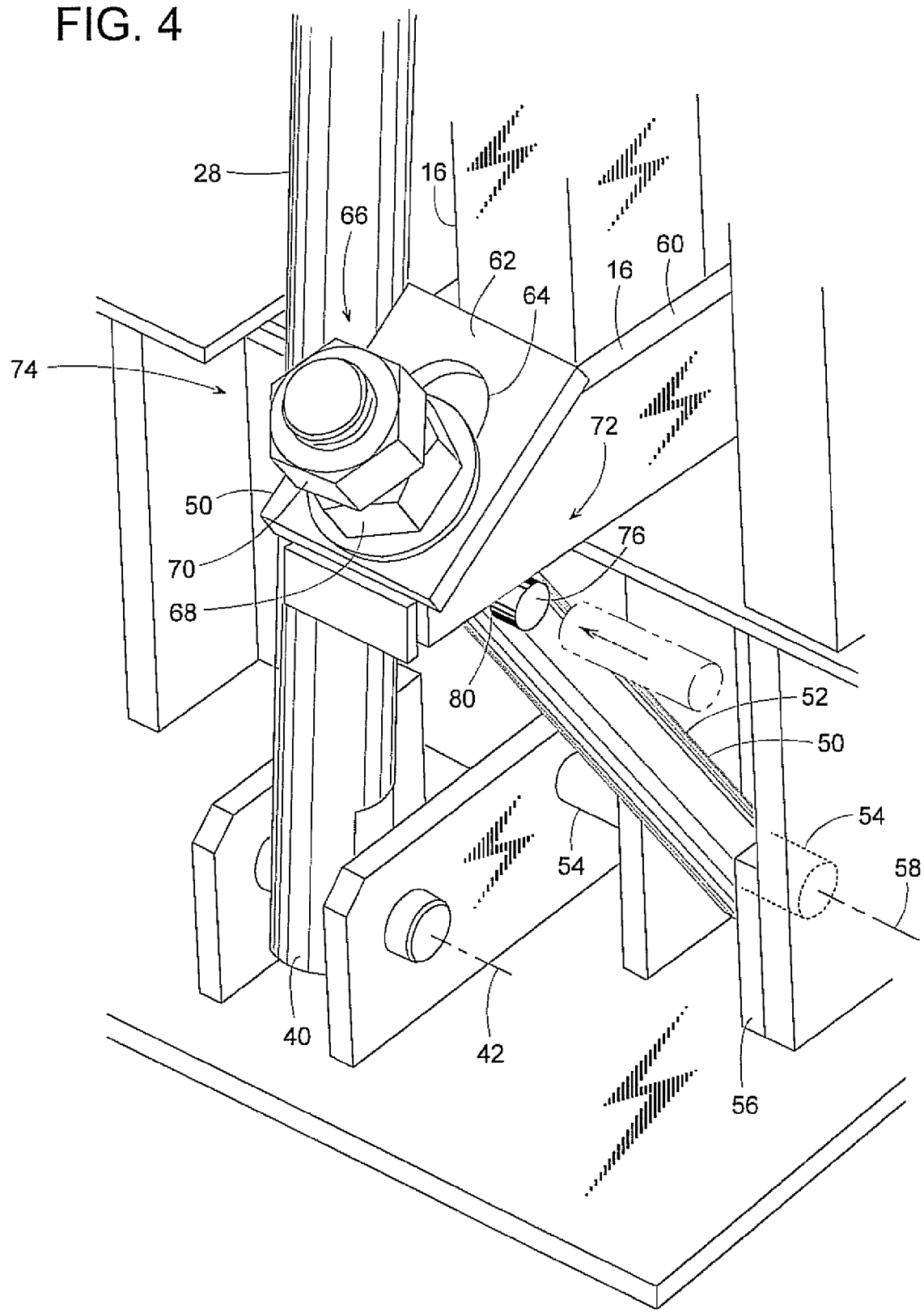
FIG. 4 is a perspective view of a stop mechanism and a lock mechanism used with the dock leveler of FIGS. 1-3.

Although the actual design of stop mechanism 50 may vary, in one example, stop mechanism 50 comprises a rod 52 that a pin 54 couples to a stationary frame member 56 of dock leveler 10. Pin 54 allows rod 52 to pivot about an axis 58 that is vertically and/or horizontally offset to axis 26 of deck 16. The offset distance between axes 26 and 58 causes relative sliding motion between rod 52 and a fixed arm 60 of deck 16. Arm 60 includes a plate 62 with an oblong hole 64 through which rod 52 extends. As deck 16 and arm 60 pivot about axis 26, rod 52 pivots about axis 58 and slides axially within hole 64. The oblong shape of hole 64 prevents rod 52 from binding within hole 64 as rod 52 tilts relative to deck 16. As deck 16 pivots toward its stored upright position, a head 66 on rod 52 eventually engages plate 62 (FIGS. 1 and 4) which limits further movement between rod 52 and plate 62 and thus stops the deck's upward pivotal motion at the deck's stored upright position.

To provide stop mechanism 50 with an adjustable feature that can vary the exact location at which deck 16 stops, the position of head 66 on rod 52 can be axially adjustable via a threaded connection between head 66 and rod 52 or by some other means. Head 66, for example, can be an internally threaded nut 68 that screws onto external threads on rod 52. Once properly adjusted, a second nut 70 can be tightened against nut 68 to hold nut 68 in place. In lieu of second nut 70, nut 68 could be of a self-locking nut or some other conventional thread locking mechanism, compound or method could be used.

In addition to actuator 28 holding deck 16 at its stored upright position, a lock mechanism 72 (FIG. 4) can be added to provide a redundant or alternative lock that prevents deck 16 from descending unexpectedly while servicing or repairing dock leveler 10. In one example, lock mechanism 72 is incorporated in the structure of stop mechanism 50, thereby creating a combination stop-and-lock mechanism 74. Lock mechanism 72, for instance, can be a removable blocking pin 76 that can be temporarily inserted into a hole 80 in rod 52 such that arm 60 becomes trapped between pin 76 and nut 68, thereby inhibiting relative sliding movement between rod 52 and arm 60.

Although the invention is described with respect to various examples, modifications thereto will be apparent to those of ordinary skill in the art. The scope of the invention, therefore, is to be determined by reference to the following claims:

The invention claimed is:

1. A dock leveler for facilitating the loading or unloading of a vehicle at a loading dock, the dock leveler comprising:
    a deck pivotal between a stored upright position and a lowered operative position;
    an arm fixed adjacent a rear edge of the deck, the arm extending away from the deck and pivoted by the deck as the deck pivots;
    an actuator having a retracted position and an extended position, the actuator being operatively coupled to the deck such that the actuator pivots the deck from the lowered operative position to the stored upright position in response to the actuator moving toward the extended position; and
    a stop positioned to engage the arm when the deck is in the stored upright position to prevent the deck from moving beyond the stored upright position when the actuator moves toward the extended position, the stop slidably engaging the arm during movement of the deck between the stored upright and extended positions, the stop preventing the deck from moving beyond the stored upright position by mechanically stopping the deck while the actuator, prior to reaching the extended position, is continuing to urge the deck beyond the stored upright position.

2. The dock leveler of claim 1, wherein the arm has a tapered surface positioned non-parallel relative to a traffic surface of the deck as the deck pivots between the stored upright position and the lowered operative position.

3. The dock leveler of claim 1, wherein the stop has an enlarged end to engage the tapered surface of the arm when the deck is in the stored upright position.

4. The dock leveler of claim 3, wherein the enlarged end of the stop is substantially parallel relative to the tapered surface of the arm when the deck is in the stored upright position.

5. The dock leveler of claim 1, wherein the stop will engage the arm prior to the actuator reaching a fully extended position.

6. The dock leveler of claim 1, further comprising an adjustable feature on the stop, wherein the adjustable feature is manipulated to vary the stored upright position.

7. The dock leveler of claim 6, wherein the adjustable feature includes a threaded connection.

8. The dock leveler of claim 3, wherein the stop comprises a rod having a threaded end, and wherein the enlarged end comprises a fastener coupled to the threaded end.

9. The dock leveler of claim 8, wherein the fastener comprises a washer and a bolt, wherein the washer is to engage the arm when the deck is in the upright stored position.

10. The dock leveler of claim 1, wherein the deck pivots about a first axis, the stop pivots about a second axis, and the actuator pivots about a third axis, and the first, second and third axes are spaced-apart relative to each other.

11. The dock leveler of claim 10, wherein the first axis is aligned substantially linearly relative to the second axis and the second axis is aligned substantially linearly relative to the third axis.

12. The dock leveler of claim 1, wherein the stop includes a lock to selectively couple the stop to the deck to mechanically hold the deck at substantially the stored upright position.

13. The dock leveler of claim 12, wherein the lock includes a removable member to selectively engage and disengage the stop to respectively couple and decouple the stop and the deck.

14. The dock leveler of claim 1, wherein the actuator and the stop exert opposing forces when the stop engages the arm to firmly hold the deck at the stored upright position.

15. A method to mechanically stop a deck leveler, the method comprising:

fixing an arm adjacent a rear edge of a deck so the arm pivots with the deck;

slidably coupling a stop to the arm;

actuating an actuator between a retracted position and an extended position to pivot the deck between a lowered operative position and a stored upright position; and mechanically stopping the deck by causing the stop to engage the arm when the deck is in the stored upright position to prevent the deck from moving beyond the stored upright position, the actuator and the stop exerting opposing forces when the stop engages the arm to firmly hold the deck at the stored upright position while the actuator is in an active condition urging the deck toward the upright position.

16. The method of claim 15, further comprising mechanically stopping the deck prior to the actuator moving to a fully extended position.

17. The method of claim 15, further comprising mechanically locking the position of the deck in the stored upright position.

18. The method of claim 15, further comprising adjusting an adjustable feature of the stop to adjust the stored upright position.

* * * * *